(No Model.)
H. J. ROHLF.
ROTARY WATER METER.
No. 522,802. Patented July 10, 1894.
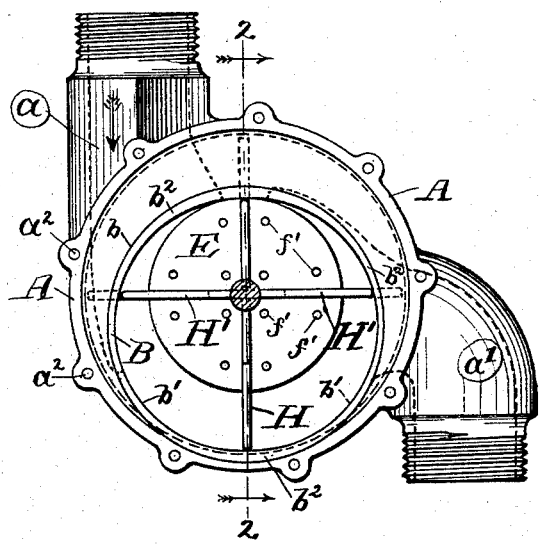
Fig. 1.
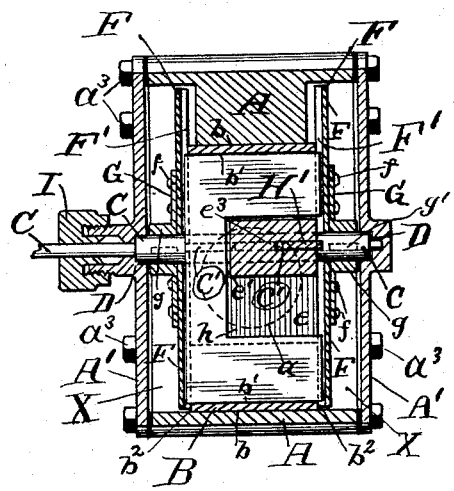
Fig. 2.
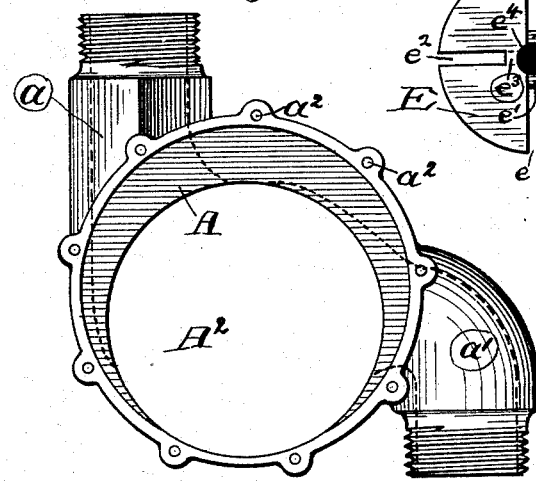
Fig. 3.
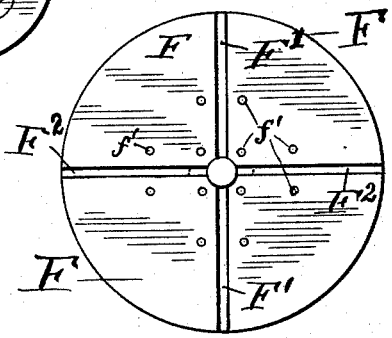
Fig. 5.
Fig. 4.
Witnesses:
R. J. Jacker.
Flora L. Brown.
Inventor:
Henry John Rohlf.
By Charles Turner Brown, Atty.

United States Patent Office.

HENRY JOHN ROHLF, OF CHICAGO, ILLINOIS.

ROTARY WATER-METER.

SPECIFICATION forming part of Letters Patent No. 522,802, dated July 10, 1894.

Application filed March 10, 1894. Serial No. 503,193. (No model.)

*To all whom it may concern:*

Be it known that I, HENRY JOHN ROHLF, residing in Chicago, in the county of Cook and State of Illinois, have invented certain new and useful Improvements in Rotary Water-Meters, of which the following, when taken in connection with the drawings accompanying and forming a part hereof, is a full and complete description.

The object of my invention is to obtain means whereby the quantity of liquid flowing through the pipes in which the machine is placed shall be accurately and automatically determined; to obtain a machine by which, when water passes therethrough, a register, or other machine substituted for the register, may be actuated; to obtain a machine which, when actuated by a motor, will force water through the pipes in which it is placed.

Another and important object sought by me and accomplished in the herein described machine is to secure a construction wherein the parts can be accurately fitted, readily assembled, not liable to get out of order and well adapted to perform the several functions assigned thereto, whereby a machine is obtained in which but little power is required to drive the same.

In the drawings referred to as forming a part of the specification: Figure 1 is a front elevation of the machine embodying my invention, with the front plate thereof, and a disk forming a part of the machine and illustrated in Fig. 4 removed, to expose to view the working parts, such disk being indicated however by dotted lines; Fig. 2, a vertical sectional view on line 2—2 of Fig. 1, viewed in the direction indicated by the arrow; Fig. 3, a front elevation of the outer casing of the machine; Fig. 4, a front elevation of a grooved disk forming an element in the machine, and Fig. 5, an end elevation of a grooved roller also forming an element in the machine, such roller having, at each end thereof, a disk (illustrated in Fig. 4), attached thereto.

The same letter of reference is used to indicate a given part where the same appears in more than one figure of the drawings.

A is the outer shell or casing of the machine: $a$ being the inlet and $a'$ the outlet thereof.

$a^2$ $a^2$ are bolt holes in the walls of the casing A, into which the screw threaded ends of the bolts $a^3$ $a^3$ respectively, are adapted to fit and thereby secure in place the heads or ends A' A' of the shell or casing A.

$A^2$ is a hole in shell or casing A, and B is a bushing, fitting tightly in hole $A^2$. I prefer to construct bushing B so that the periphery $b$ thereof is circular, but such bushing being immovable in casing A, it is immaterial of what shape such periphery is, so long as the same corresponds with the hole in casing A.

$b'$ is the inner face of bushing B and must be oval and is practically an ellipse. $b^2$ $b^2$ are the end faces of such bushing B.

C is a shaft rotatably mounted in journals D D in heads A' A', and C' C', (Fig. 2,) are slots extending through shafts C.

E is a roller having therein radial grooves, $e$—$e$ extending from the periphery of the roller in toward, but not to, the center or axial line of the roller, and $e'$ is a groove on one end of roller E connecting grooves $e$—$e$ together.

$e^2$ $e^2$ are grooves extending in from the periphery of the roller E on the diameter of such roller at right angles with the diameter on which grooves $e$—$e$ extend. Grooves $e^2$ $e^2$ do not extend to the center, or axial line of the roller E, but are connected together by groove $e^3$ on the opposite end of the roller to groove $e'$.

$e^4$ is a hole extending through roller E in which shaft C may be placed, to rotatably mount the roller in the bushing B so that the periphery of the roller will be near to contact with the inner oval wall of such bushing, to one side thereof.

The length of the roller E is substantially the same as the depth of the bushing B, and F F are grooved disks, rigidly mounted on the shaft C and secured to the ends of the roller E so that the inner faces of such disks are near to contact with the edges $b^2$ $b^2$, respectively, of the bushing B. To rigidly mount the disks F and roller E on shaft C; G G are disks, $g$ is a hub to disk G, $g'$ $g'$ are keys by which the disks G, respectively, are secured on such shaft C, and $f$—$f$ are screws or bolts extending through the disk G, disk F and into roller E. $f'$, $f'$, (Fig. 4,) are holes in the disk F through which the screws, $f$—$f$ extend.

F' $F^2$ are grooves in the face of disk F,

The disks F F are secured on the end of the roller E so that the grooves F' F' are in the same plane with grooves $e\ e\ e'$, and grooves $F^2\ f^2$ in the same plane with grooves $e^2\ e^2\ e^3$.

H is a paddle having part $h$ thereof cut away extending in grooves $e\ e$, and $e'$; and H' is a paddle, the duplicate of paddle H, placed in grooves $e^2\ e^2\ e^3$.

The slots C' C' in shaft E must be of a length to correspond with the width of the paddles H H', and hence; except where through strength it becomes necessary to extend the shaft C entirely through the roller E, I prefer not to construct the shaft C in one piece, but rather in two pieces, each thereof extending up to and abutting against roller E or against disk F at the end of such roller. In such construction, hole $e^4$, (Fig. 5,) in roller E, is omitted and the disks G G, respectively, are preferably keyed to the shafts C C.

I is a stuffing box around shaft C, where the same extends through the end A' of the casing.

Shaft C is connected to the register or other mechanism desired to be driven by the machine. Where the machine is to be used as a pump, shaft C is driven that is rotated, thereby driving disks F F, roller E and paddles H H'.

It will be observed that the width of the paddles H H' is greater than is the depth of the bushing B, and hence such paddles extend beyond the bushing, and into the grooves F' F' $F^2$ $F^2$, respectively, in disks F F.

The operation of the device is: When water is admitted in inlet $a$, of shell A, such water coming in contact with the periphery of the roller E and the face of the paddles H H' adjacent to the inlet, will, in its passage through the machine to the outlet $a'$, cause roller E to rotate, together with the disks F F secured thereto, by means of the portion of the paddles H H' immersed in the water passing through the machine. As the roller E and disks F F are thus rotated the paddles H H' slide in the respective grooves $e\ e\ e'$ F' F', and $e^2\ e^2\ e^3$ $F^2$ $F^2$. It is designed that water or other liquid passing through the machine may pass between the ends $b^2\ b^2$ of bushing B and the adjacent face of disks F F, and fill the space X X in the casing between the heads A A' and disks F F, so that whatever the pressure of the water passing through the machine may be the disks F F will not receive such pressure, but rather will be rotated in water having a substantially equal pressure upon the back of the disks as the water passing through the machine has upon the face of such disks. As water, or other liquid, extends through the machine the paddles H H' will, respectively, be forced against the forward edge of the grooves in which such paddles are placed, so that there is no leakage around the side edges of the paddles, the only leakage possible to occur being over the ends of the paddles, that is between the ends thereof and the inner oval wall of bushing B; and I have found in practice that by making paddles non-extensible and of length substantially equal to the shorter diameter of the oval, with the axis of the roller E (that is the point of intersection of the planes in which the paddles are placed) at that point on the shorter diameter of the oval where a chord at right angles thereto is of equal length with such shorter diameter, such paddles will at all times be substantially in contact with the oval wall of the chamber. By not extending the respective grooves $e\ e$ and $e^2\ e^2$ into the center of the roller E, two important results are accomplished by me, first; the only water or other liquid which, in the operation of the machine, can extend through the roller must pass through the grooves $e'\ e^3$ in the ends of the roller, and in the space in such grooves, respectively, not occupied by the part of the respective paddles H H' extending through such grooves; secondly, the paddles H H' do not come in contact with each other in the operation of the machine, and thirdly, the roller E being constructed of solid material and the respective grooves not extending through the roller so as to divide the same into separate parts or quarters, the disks F F and G G and shaft C are more readily assembled than would be the case if roller E were cut into four pieces.

Having thus described my invention, what I claim as new, and desire to secure by Letters Patent, is—

1. A casing having an inlet and an outlet and a bushing therein, such bushing not extending to the ends of the casing and having an oval-walled hole therethrough, in combination with a roller having grooves therein rotatably mounted in the bushing so that the periphery thereof is near to contact with the oval wall of the bushing and with the shaft of the roller extending through one of the ends of the casing, disks, concentrically mounted on the roller shaft, secured to the ends of the roller, such disks having radial grooves co-incident with the grooves in the roller on the faces adjacent to the ends of the roller, and such faces near to contact with the ends of the bushing, and paddles mounted in the grooves therefor, such paddles having a portion thereof, respectively, taken away and adapted to slide in the grooves therefor as the roller and disks rotate so that the ends of the paddles will alternately project beyond the periphery of the roller and be flush therewith; substantially as described.

2. The combination of a roller having grooves therein extending in from the periphery thereof and connecting grooves, with disks concentrically mounted on the ends of the rollers, such disks having radial grooves corresponding with the grooves in the roller and on the faces adjacent to the roller, and paddles having a portion thereof taken away, respectively, mounted in the grooves, respectively, so as to be slid therein as the roller and disks turn, and such paddles adapted to have the ends thereof alternately projected beyond the periphery of the roller and retracted flush therewith; substantially as described.

3. The combination of a roller mounted on a rotatable shaft and having radial grooves extending from the periphery thereof in toward, but not to, the axial center thereof and having grooves connecting the first named grooves, respectively, on opposite sides of the roller, with disks concentrically mounted on the roller shaft and secured to the ends of the roller, such disks having on the faces thereof adjacent to the ends of the roller, radial grooves corresponding, respectively, with the grooves in the roller, and paddles having a portion thereof cut away, respectively, mounted in the grooves so that as the roller and disks turn such paddles may be slid in the respective grooves therefor and the ends of the paddles may alternately project beyond the periphery of the roller and be flush therewith; substantially as described.

HENRY JOHN ROHLF.

Witnesses:
CHARLES TURNER BROWN,
L. R. NOLD.